United States Patent Office 3,219,687
Patented Nov. 23, 1965

3,219,687
BIS(1H,1H-PERFLUOROOCTYL)-α-n-DODECENYL SUCCINATE
William A. Zisman, 200 E. Melbourne Drive, Silver Spring, Md., and Jacques G. O'Rear, 5420 Henderson Road, Camp Springs, Md.
No Drawing. Filed Jan. 10, 1963, Ser. No. 250,720
1 Claim. (Cl. 260—485)
(Granted under Title 35, U.S. Code (1952), sec. 266)

The invention described herein may be manufactured and used by or for the Government of the United States of America for governmental purposes without the payment of any royalties thereon or therefor.

This invention relates to fluorocarbon derivatives, more particularly to a new polyfluoroalkyl ester.

In the field of surface active agents for organic solvents, the art is confronted by the fact that there are no surface active agents which are equally efficient in all organic solvents. The most suitable surface active agents for a particular organic solvent depend on the difference in surface tension of the solute and the solvent, the greater this difference, the higher the efficiency of the solute as a surface active agent for the solvent.

The new polyfluoroalkyl ester of our invention is the diester, bis(1H,1H-perfluorooctyl)-α-n-dodecenyl succinate,

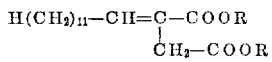

wherein R is the 1H,1H-perfluorooctyl group,

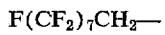

The new diester is a highly efficient surface active agent in small concentrations in the range of 0.0001–0.1 mole/liter for lowering the surface tension of the organic solvents, propylene carbonate, nitromethane, dioxane and ethyl benzene.

Preparation of the new diester may be carried out by the method and with the apparatus for the esterification of perfluoroalkylcarbinols which is described in Ind. Eng. Chem., 49, 189 (1957), using p-toluene sulfonic acid as the catalyst and a solvent-diluent which forms an azeotrope with the water of the reaction. The product diester is taken up in diethyl ether, washed with dilute aqueous sodium bicarbonate solution and dried, as over magnesium sulfate, all in conventional way, and distilled.

The preparation of the new diester from α-n-dodecenyl succinic anhydride and 1H,1H-perfluorooctyl alcohol, $F(CF_2)_7CH_2OH$, is illustrated by the following specific example.

Example

A mixture of 39.96 grams (0.15 mole) α-n-dodecenyl succinic anhydride, 132 grams (0.33 mole) 1H,1H-perfluorooctyl alcohol, 200 ml. toluene, 100 ml. carbon tetrachloride and 1.5 grams p-toluene sulfonic acid monohydrate was refluxed with stirring for 8 hours, at which time all of the water of reaction had been removed from the reaction mixture. A total of 2.7 grams of water was collected in the trap. Diethyl ether was added to the residual mixture to take up the product diester. The ether solution of the product diester was washed with aqueous 1% sodium bicarbonate solution, dried and distilled to yield 38.8 grams (24.7% yield) of the product succinate diester; B.P. 185° C. at 0.3 mm. Hg; $n_D^{20}$ 1.3685; $d_4^{20}$ 1.484.

Theory on the mode of functioning of the new succinate diester as a surface active agent in organic solvents and data respecting the same as a surface active agent is contained in J. Physical Chemistry, 66, 328 (1962), which article, by reference, is incorporated herein and made part of this disclosure.

The addition of the succinate surface active agent of the invention to the organic solvents increases their wetting power and oxidation stability and decreases their flammability and tendency to foam.

While the invention has been described herein with reference to a particular mode of preparing the new succinate diester, such is intended by way of illustration and not in limitation.

What is claimed is:
Bis(1H,1H-perfluorooctyl)-α-n-dodecenyl succinate.

References Cited by the Examiner

UNITED STATES PATENTS

| | | | |
|---|---|---|---|
| 2,294,259 | 8/1942 | Van Peski et al. | 260—485 |
| 2,972,638 | 2/1961 | Tiers | 260—485 |

OTHER REFERENCES

Bernett et al.: NRL Report 5705, December 18, 1961, pages 1–18.

Bernett et al.: Journal of Physical Chemistry, vol. 66, pages 328–336 (1962).

Jarvis et al.: Journal of Physical Chemistry, vol. 63, pp. 727–734 (1959).

LORRAINE A. WEINBERGER, *Primary Examiner.*

LEON ZITVER, *Examiner.*